US012230448B2

(12) United States Patent
Kobayashi et al.

(10) Patent No.: US 12,230,448 B2
(45) Date of Patent: Feb. 18, 2025

(54) ELECTRONIC COMPONENT WITH METAL TERMINAL, CONNECTION STRUCTURE, AND METHOD FOR MANUFACTURING CONNECTION STRUCTURE

(71) Applicant: TDK CORPORATION, Tokyo (JP)

(72) Inventors: Hisashi Kobayashi, Tokyo (JP); Norihisa Ando, Tokyo (JP); Toshihiro Iguchi, Tokyo (JP); Kenya Tamaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 149 days.

(21) Appl. No.: 17/899,797

(22) Filed: Aug. 31, 2022

(65) Prior Publication Data

US 2023/0073043 A1 Mar. 9, 2023

(30) Foreign Application Priority Data

Sep. 3, 2021 (JP) .................................. 2021-143797

(51) Int. Cl.
*H01G 4/232* (2006.01)
*H01G 4/012* (2006.01)
*H01G 4/12* (2006.01)
*H01G 4/30* (2006.01)

(52) U.S. Cl.
CPC ............. *H01G 4/232* (2013.01); *H01G 4/012* (2013.01); *H01G 4/1227* (2013.01); *H01G 4/30* (2013.01)

(58) Field of Classification Search
CPC .......... H05K 1/181; H01G 2/06; H01G 2/065; H01G 4/12
See application file for complete search history.

(56) References Cited

U.S. PATENT DOCUMENTS

| 4,777,564 | A | * | 10/1988 | Derfiny | ............. | H01L 23/49555 361/776 |
| 5,241,134 | A | * | 8/1993 | Yoo | .................... | H01L 23/49541 439/876 |
| 6,114,759 | A | * | 9/2000 | Okuaki | ............. | H01L 23/49555 257/692 |
| 2014/0063687 | A1 | | 3/2014 | Saito et al. | | |
| 2018/0374642 | A1 | * | 12/2018 | Akiyoshi | ............. | H05K 3/3426 |

FOREIGN PATENT DOCUMENTS

| CN | 116959884 A | * | 10/2023 |
| JP | S56-045576 A | | 4/1981 |
| JP | S62-213226 A | | 9/1987 |
| JP | H0521683 A | * | 1/1993 |
| JP | H0817679 A | * | 1/1996 |
| JP | 2014-063987 A | | 4/2014 |

* cited by examiner

*Primary Examiner* — Nathan Milakovich
(74) *Attorney, Agent, or Firm* — Oliff PLC

(57) ABSTRACT

An electronic component with a metal terminal includes an electronic component having an element body, and external electrodes respectively provided on end surfaces facing each other in an X direction in the element body; and plate-shaped metal terminals having joint portions joined to the external electrodes, and leg portions provided to protrude beyond the electronic component in a Z direction. The leg portion of the metal terminal has an extending part continuously extending in the Z direction from the joint portion, a first bent part bent from a tip of the extending part to the electronic component side at a first angle formed to be an acute angle with respect to the extending part, and a second bent part bent from a tip of the first bent part at a second angle larger than the first angle with respect to the extending part.

9 Claims, 10 Drawing Sheets

Comparative Example

Comparative Example

ELECTRONIC COMPONENT WITH METAL TERMINAL, CONNECTION STRUCTURE, AND METHOD FOR MANUFACTURING CONNECTION STRUCTURE

TECHNICAL FIELD

The present disclosure relates to an electronic component with a metal terminal, a connection structure, and a method for manufacturing a connection structure.

BACKGROUND

In the related art, for example, an electronic component with a metal terminal in which a metal terminal is provided on each of a pair of end surfaces of a chip-type electronic component such as a laminated ceramic capacitor is known. In such an electronic component, a metal terminal is used for mounting with respect to a connection target member such as a circuit board. For example, electrical connection of an electronic component with respect to a connection target member can be realized by causing a tip part of a metal terminal protruding beyond the electronic component to abut on a mounting surface of the connection target member and soldering the tip part of the metal terminal onto the mounting surface.

Regarding an electronic component with a metal terminal in the related art, for example, Japanese Unexamined Patent Publication No. S62-213226 describes a chip-type electronic component. In this electronic component in the related art, a plate-shaped metal terminal formed by bending along an outer surface of the electronic component is provided. A tip of the metal terminal is bent at an acute angle toward the electronic component side with respect to a part along the outer surface of the electronic component.

SUMMARY

As in the electronic component described in the foregoing Japanese Unexamined Patent Publication No. S62-213226, when a constitution having a bent tip of a metal terminal is employed, unevenness in height dimension of an electronic component can be offset by an amount of bending of the tip of the metal terminal. Therefore, unevenness in height dimension of a connection structure after an electronic component is mounted can be curbed. On the other hand, in a case where the tip of the metal terminal is bent at an acute angle toward the electronic component side, there is a problem that when a solder paste positioned between the bent part and a mounting surface is melted and solidified, the solder is likely to contract on a base end side of the bent part, that is, an abutting part side between the metal terminal and the mounting surface. If the solder significantly contracts on the base end side of the bent part, there is concern that a joint area between the metal terminal and the mounting surface due to the solder may become insufficient and a mounting position may become unstable.

The present disclosure has been made in order to resolve the foregoing problems, and an object thereof is to provide an electronic component, in which unevenness in height dimension at the time of mounting can be curbed and a mounting position can be made stable, a connection structure, and a method for manufacturing a connection structure.

An electronic component with a metal terminal according to an aspect of the present disclosure includes one or a plurality of electronic components having an element body, and a pair of external electrodes respectively provided on a pair of end surfaces facing each other in a first direction in the element body; and a pair of plate-shaped metal terminals having joint portions joined to the external electrodes, and leg portions provided to protrude beyond the electronic components in a second direction intersecting the first direction. The leg portion of each of the pair of metal terminals has an extending part continuously extending in the second direction from the joint portion, a first bent part bent from a tip of the extending part to the electronic component side at a first angle formed to be an acute angle with respect to the extending part, and a second bent part bent from a tip of the first bent part at a second angle larger than the first angle with respect to the extending part.

In this electronic component with a metal terminal, the leg portion of each of the pair of metal terminals has the first bent part which is bent from the tip of the extending part to the electronic component side at the first angle formed to be an acute angle with respect to the extending part. Accordingly, when the tip of the extending part is caused to abut on a mounting surface, unevenness in height dimension of the electronic component can be offset by an amount of bending of a bent part of a tip of the metal terminal, and thus unevenness in height dimension at the time of mounting can be curbed. In addition, in this electronic component with a metal terminal, the leg portion of each of the pair of metal terminals has the second bent part which is bent from the tip of the first bent part at the second angle larger than the first angle with respect to the extending part. Since such a second bent part is provided, a solder paste positioned between the leg portion and the mounting surface at the time of mounting comes into contact with the second bent part and is likely to stay at this place, and thus an amount of solder contracting on an abutting part side between the metal terminal and the mounting surface can be regulated. Therefore, a joint area between the metal terminal and the mounting surface due to the solder can be sufficiently secured, and a mounting position can be made stable.

The second angle may be a right angle. In this case, a solder paste positioned between the leg portion and the mounting surface at the time of mounting is more likely to come into contact with the second bent part, and thus the amount of solder contracting on the abutting part side between the metal terminal and the mounting surface can be more sufficiently regulated.

A length of the second bent part may be longer than a length of the first bent part. Since the length of the second bent part is sufficiently secured, a solder paste positioned between the leg portion and the mounting surface at the time of mounting is more likely to come into contact with the second bent part, and thus the amount of solder contracting on the abutting part side between the metal terminal and the mounting surface can be more sufficiently regulated.

A tip of the second bent part may be positioned on the electronic component side of the tip of the extending part. In this case, when the tip of the extending part is caused to abut on the mounting surface, the tip of the second bent part can be prevented from touching the mounting surface. Therefore, inhibition of an effect of curbing unevenness in height dimension at the time of mounting can be avoided.

When viewed in the first direction, the second bent part may be curved such that the electronic component side protrudes. In this case, since solder contracts on a center side in the second direction at the time of melting/solidifying a solder paste, the mounting position with respect to the second direction can be made stable.

A connection structure according to another aspect of the present disclosure is a connection structure formed by connecting the foregoing electronic component with a metal terminal to a connection target member. The tip of the extending part, the first bent part, and the second bent part of the metal terminal in the electronic component with a metal terminal are joined to a mounting surface of the connection target member using solder.

In this connection structure, the leg portion of each of the pair of metal terminals has the first bent part which is bent from the tip of the extending part to the electronic component side at the first angle formed to be an acute angle with respect to the extending part continuously extending in the second direction from the joint portion. Accordingly, when the tip of the extending part is caused to abut on the mounting surface, unevenness in height dimension of the electronic component can be offset by the amount of bending of the bent part of the tip of the metal terminal, and thus unevenness in height dimension at the time of mounting can be curbed. In addition, in this connection structure, the leg portion of each of the pair of metal terminals has the second bent part which is bent from the tip of the first bent part at the second angle larger than the first angle with respect to the extending part. Since such a second bent part is provided, a solder paste positioned between the leg portion and the mounting surface at the time of mounting comes into contact with the second bent part and is likely to stay at this place, and thus the amount of solder contracting on the abutting part side between the metal terminal and the mounting surface can be regulated. Therefore, the joint area between the metal terminal and the mounting surface due to the solder can be sufficiently secured, and the mounting position can be made stable.

The second bent part may have a part parallel to the mounting surface of the connection target member. In this case, a solder paste positioned between the leg portion and the mounting surface at the time of mounting is more likely to come into contact with the second bent part, and thus the amount of solder contracting on the abutting part side between the metal terminal and the mounting surface can be more sufficiently regulated.

A method for manufacturing a connection structure according to another aspect of the present disclosure is a method for manufacturing a connection structure formed by connecting the foregoing electronic component with a metal terminal to a connection target member. The method for manufacturing a connection structure includes a first step of causing the tip of the extending part of the metal terminal in the electronic component with a metal terminal to abut on a mounting surface of the connection target member having a solder paste disposed thereon; and a second step of joining the leg portion of the metal terminal to the mounting surface of the connection target member by melting and solidifying the solder paste in a state where the solder paste is brought into contact with the tip of the extending part, the first bent part, and the second bent part of the metal terminal.

In this method for manufacturing a connection structure, when the tip of the extending part is caused to abut on the mounting surface, unevenness in height dimension of the electronic component can be offset by the amount of bending of the bent part of the tip of the metal terminal, and thus unevenness in height dimension at the time of mounting can be curbed. In addition, since a solder paste is brought into contact with the tip of the extending part, the first bent part, and the second bent part of the metal terminal, a solder paste positioned between the leg portion and the mounting surface at the time of mounting is likely to stay at this place, and thus the amount of solder contracting on the abutting part side between the metal terminal and the mounting surface can be regulated. Therefore, the joint area between the metal terminal and the mounting surface due to the solder can be sufficiently secured, and the mounting position can be made stable.

In the second step, a part parallel to the mounting surface of the connection target member may be formed in the second bent part. In this case, a solder paste positioned between the leg portion and the mounting surface at the time of mounting is more likely to come into contact with the second bent part, and thus the amount of solder contracting on the abutting part side between the metal terminal and the mounting surface can be more sufficiently regulated.

DETAILED DESCRIPTION

Hereinafter, with reference to the drawings, a preferred embodiment of an electronic component with a metal terminal, a connection structure, and a method for manufacturing a connection structure according to aspects of the present disclosure will be described in detail.

Figure 1:
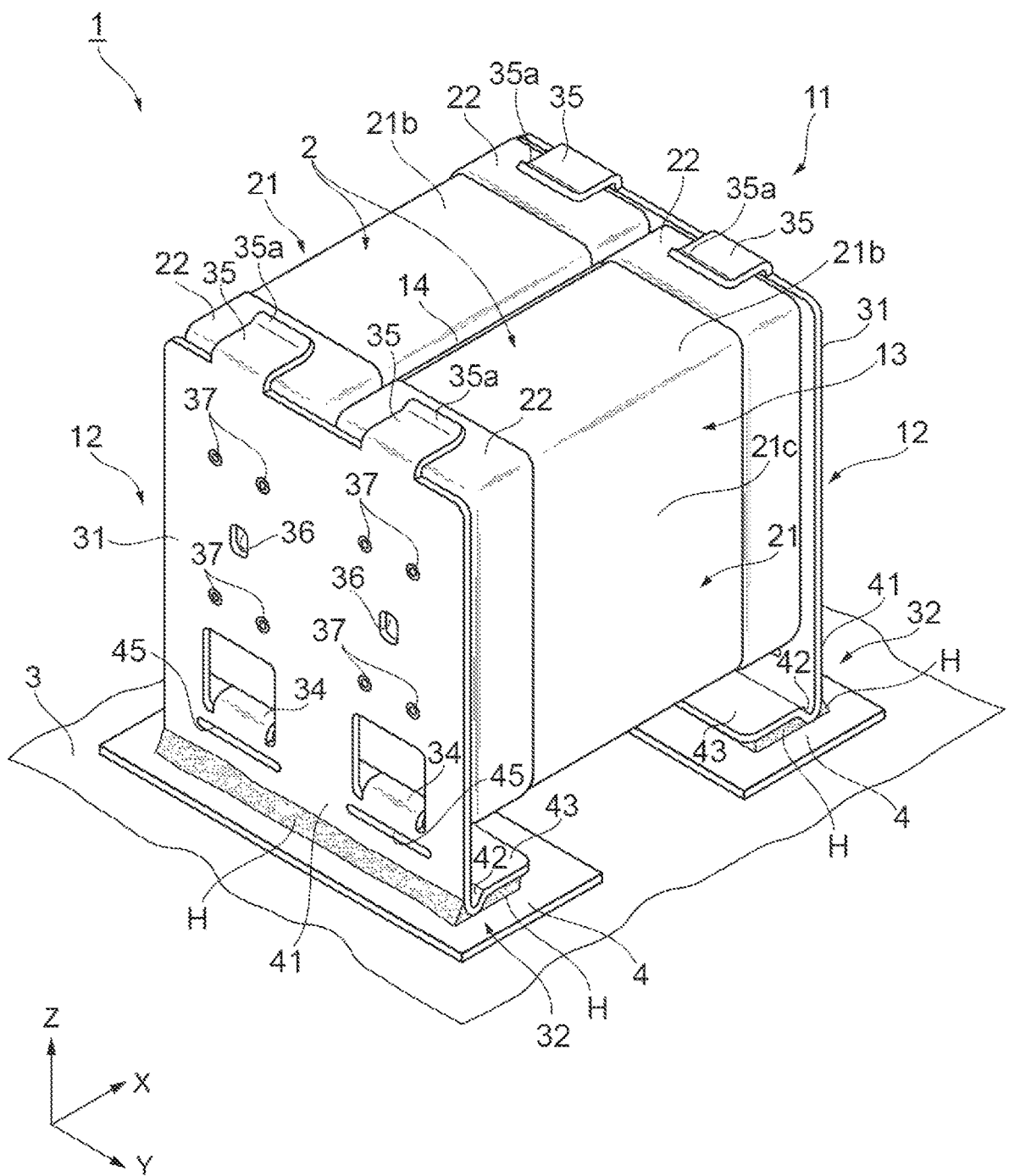
FIG. 1 is a perspective view illustrating an example of a connection structure constituted using an electronic component with a metal terminal according to an aspect of the present disclosure.
Figure 2:
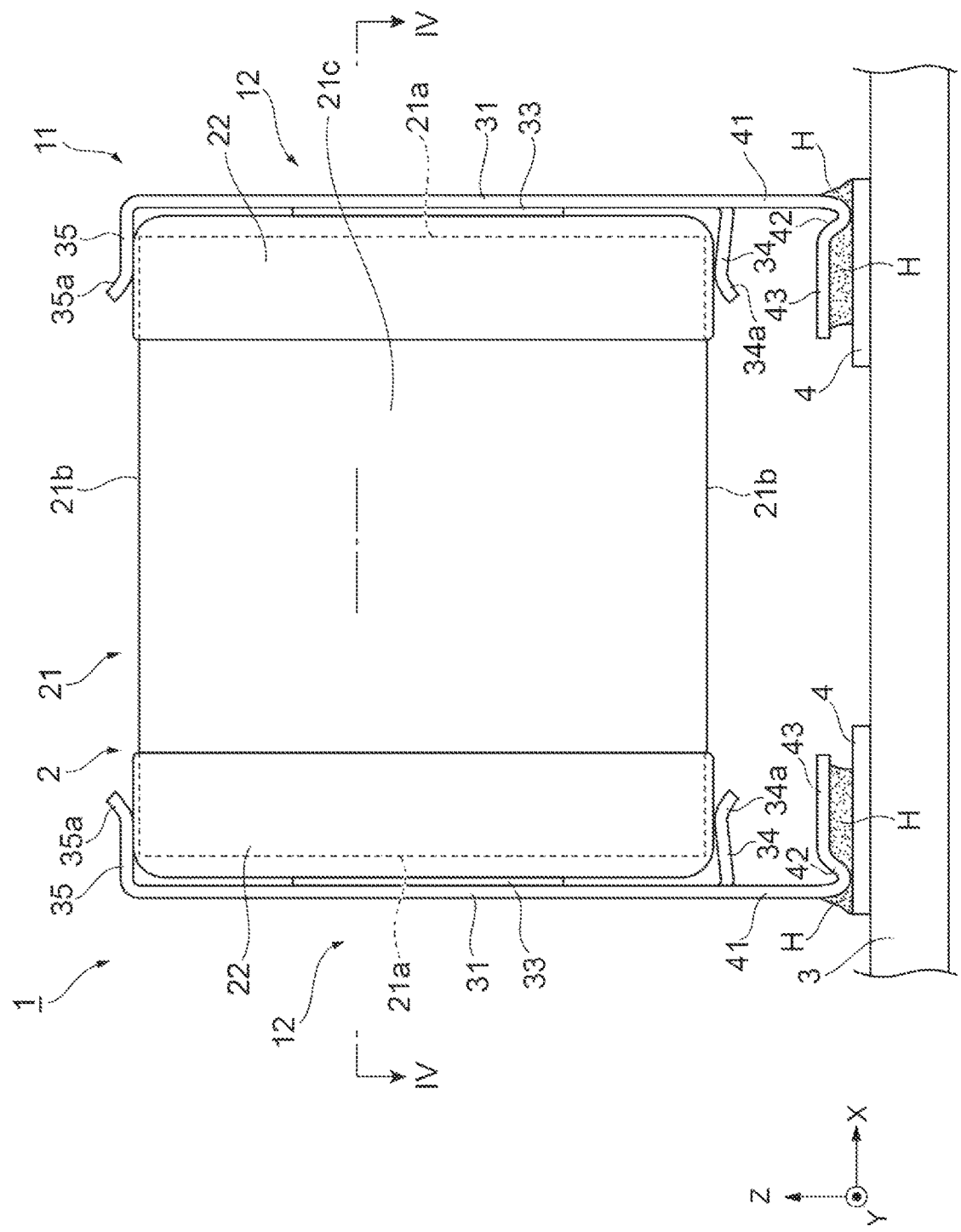
FIG. 2 is a side view of FIG. 1.
Figure 3:
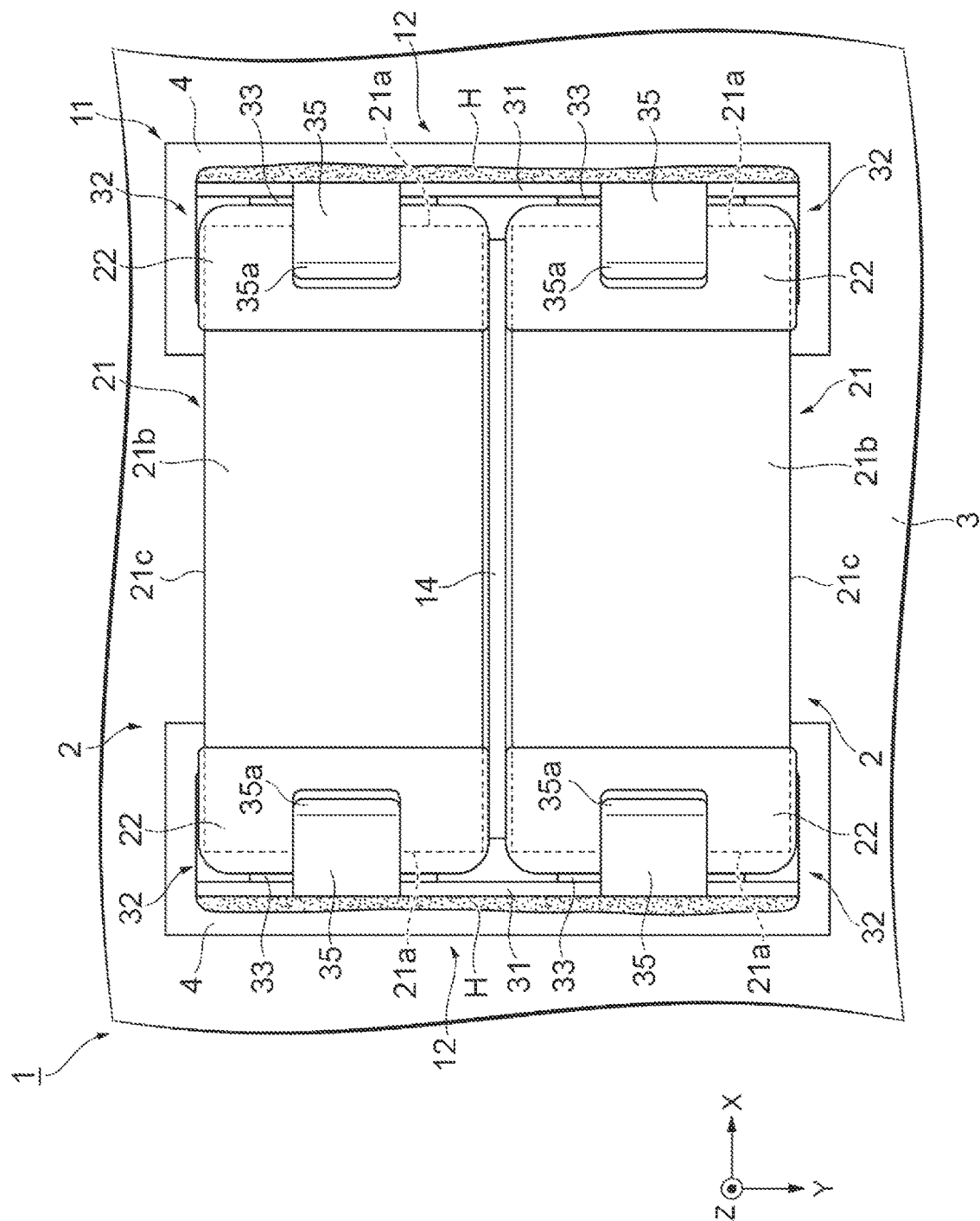
FIG. 3 is a plan view of FIG. 1.

FIG. 1 is a perspective view illustrating an example of a connection structure constituted using an electronic component with a metal terminal according to an aspect of the present disclosure. FIG. 2 is a side view of FIG. 1, and FIG. 3 is a plan view of FIG. 1. A connection structure 1 illustrated in FIGS. 1 to 3 is constituted by electrically connecting electronic components 2 to pads (mounting surface) 4 of a connection target member 3. For example, the electronic components 2 are chip-type electronic components such as laminated ceramic capacitors. For example, the connection target member 3 is a different electronic component, a circuit member, a printed board, or the like.

For electrical connection to the connection target member 3, the electronic components 2 are constituted as an electronic component 11 with a metal terminal. The electronic component 11 with a metal terminal has a form in which one or a plurality of electronic components 2 are held by a pair of plate-shaped metal terminals 12 and 12. In the present embodiment, the electronic component 11 with a metal terminal has an arrangement body 13 in which two electronic components 2 are arranged in an extending direction of the pads 4. The pair of metal terminals 12 and 12 are disposed in a manner of facing each other in a direction orthogonal to an arrangement direction of the electronic components 2 in the arrangement body 13. The arrangement body 13 has the electronic components 2 and 2 adjacent to each other in a Y direction, and an insulation member 14 (refer to FIGS. 1 and 3) disposed between the electronic components 2 and 2. In the following description, a facing direction of the pair of metal terminals 12 and 12 will be referred to as an X direction, the arrangement direction of the electronic components 2 in the arrangement body 13 will be referred to as the Y direction, and a connection direction of the electronic components 2 and the pads 4 will be referred to as a Z direction. In addition, for the sake of convenience of description, the pad 4 side may be referred to as a downward side, and a side opposite to the pads 4 may be referred to as an upward side.

As illustrated in FIGS. 1 to 3, each electronic component 2 includes an element body 21, and a pair of external electrodes 22 and 22 disposed on outer surfaces of the element body 21. The element body 21 has a rectangular parallelepiped shape. A rectangular parallelepiped shape may also include a shape having chamfered corner portions and ridgeline portions and a shape having rounded corner portions and ridgeline portions. Each element body 21 has a pair of end surfaces 21a and 21a (refer to FIGS. 2 and 3) in a longitudinal direction, a pair of end surfaces 21b and 21b in a height direction, and a pair of end surfaces 21c and 21c in a width direction. The facing direction of the end surfaces 21a and 21a is a first direction of the present disclosure and coincides with the X direction. The facing direction of the end surfaces 21b and 21b is a second direction of the present disclosure and coincides with the Z direction. The facing direction of the end surfaces 21c and 21c is orthogonal to the first direction and the second direction and coincides with the Y direction.

The element body 21 is constituted by laminating a plurality of dielectric layers in a predetermined direction. In the element body 21, a lamination direction of the plurality of dielectric layers coincides with the Y direction. Each dielectric layer is constituted of a sintered body of a ceramic green sheet including a dielectric material. Examples of a dielectric material include dielectric ceramics such as $BaTiO_3$-based dielectric ceramic, $Ba(Ti,Zr)O_3$-based dielectric ceramic, and $(Ba,Ca)TiO_3$-based dielectric ceramic. In an actual element body 21, dielectric layers are integrated to an extent that boundaries between the dielectric layers cannot be visually recognized.

Figure 4:
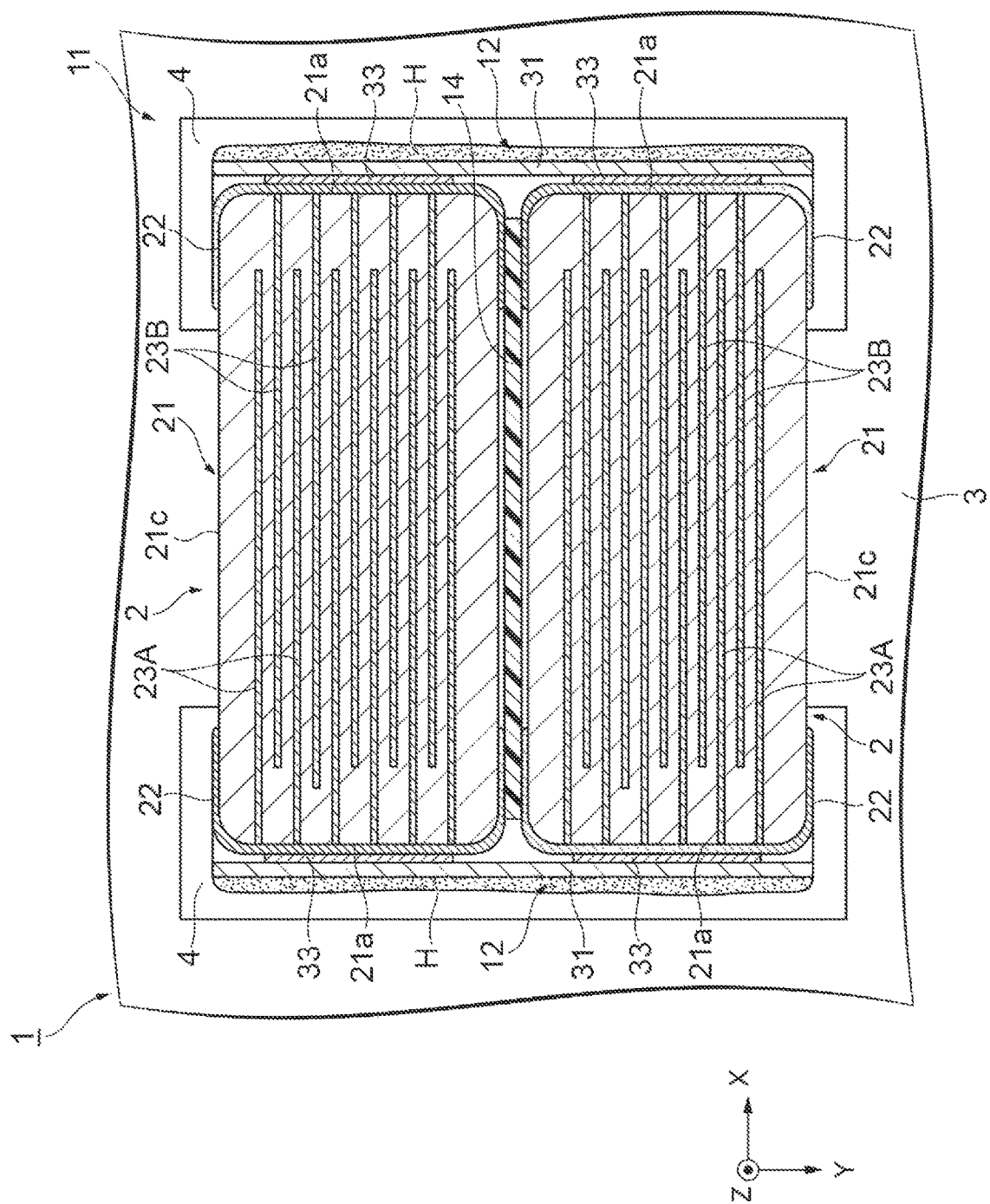
FIG. 4 is a cross-sectional view along line IV-IV in FIG. 2.

Inside the element body 21, as illustrated in FIG. 4, a plurality of internal electrodes 23A and 23B are disposed. Regarding the internal electrodes 23A and 23B, conductive materials which are generally used as internal electrodes of a lamination-type electrical element are used. The internal electrodes 23A and 23B are constituted of sintered bodies of conductive pastes including a conductive material. Examples of a conductive material include base metals such as Ni and Cu. In the present embodiment, Ni is used as a conductive material.

The internal electrodes 23A and 23B have electrical polarities different from each other. Inside the element body 21, the internal electrodes 23A and 23B are alternately disposed with certain gaps therebetween in the Y direction. The internal electrodes 23A and 23B have facing parts facing each other in the Z direction. The internal electrodes 23A are drawn out to one end surface 21a side and are exposed on the one end surface 21a. The internal electrodes 23B are drawn out to the other end surface 21a side and are exposed on the other end surface 21a.

The pair of external electrodes 22 and 22 have electrical polarities different from each other. One of the external electrodes 22 and 22 is a positive electrode, and the other thereof is a negative electrode. As illustrated in FIGS. 1 to 3, the external electrodes 22 are provided such that the end surfaces 21a of the element body 21 are covered. The external electrodes 22 have electrode parts projecting to the end surfaces 21b and 21b and the end surfaces 21c and 21c. That is, external electrodes 5 are formed throughout five surfaces including the end surfaces 21b and 21b and the end surfaces 21c and 21c centering on end surfaces 3a. These electrode parts are connected to each other in the ridgeline portions of the element body 21 and are electrically connected to each other.

The electrode part covering one end surface 21a of the external electrode 22 is disposed such that an exposed part of an internal electrode 23 on the one end surface 21a is covered. Similarly, the electrode part covering the other end surface 21a of the external electrode 22 is disposed such that an exposed part of the internal electrode 23 on the other end surface 21a is covered. Accordingly, the internal electrodes 23A and 23B are electrically connected to the corresponding external electrodes 5, respectively.

The external electrode 22 may be constituted to include a first electrode layer on the element body 21 side, and a second electrode layer on a side opposite to (outer surface side) the element body 21. For example, the first electrode layer may be formed by baking a conductive paste applied to a surface of the element body 21. The first electrode layer is a sintered metal layer formed of a sintered metal component (metal powder) included in the conductive paste. The first electrode layer may be a sintered metal layer consisting of Cu or may be a sintered metal layer consisting of Ni. A conductive paste in which a glass component, an organic binder, and an organic solvent are mixed into a powder consisting of Cu or Ni can be used. For example, the second electrode layer may be formed on the first electrode layer by a plating method. For example, the second electrode layer may include a Ni plating layer formed on the first electrode layer, and a Sn plating layer formed on the Ni plating layer.

The electronic component 2 having such a constitution described above is disposed such that the end surfaces 21a and 21a and the end surfaces 21c and 21c become perpendicular to the pads 4 and the end surfaces 21*b* and 21*b* become parallel to the pads 4. One end surface 21*b* is a facing surface facing the pads 4. In the arrangement body 13, the electronic components 2 and 2 are arranged such that one end surface 21*c* of one electronic component 2 and the other end surface 21*c* of the other electronic component 2 face each other with the insulation member 14 therebetween. In addition, the electronic components 2 and 2 are arranged such that both end positions thereof in the X direction and both end positions thereof in the Z direction coincide with each other.

For example, the insulation member 14 is constituted using an insulating resin such as an epoxy resin. The insulation member 14 may be constituted using plastic, ceramic, or glass having insulating properties. For example, the insulation member 14 is an insulating film or an insulating sheet having a rectangular shape equivalent to those of the end surfaces 21*c*. The insulation member 14 is sandwiched by the electronic components 2 and 2 adjacent to each other in the arrangement direction and comes into contact with each of the electronic components 2 and 2. The insulation member 14 may be adhered to at least one of the electronic components 2 and 2. The insulation member 14 may not necessarily be disposed.

Both the pair of metal terminals 12 and 12 are formed of a conductive metal material having a plate shape. Examples of a metal material include iron, nickel, copper, silver, and alloys including these. Each metal terminal 12 has a joint portion 31 joined to the external electrodes 22, and a leg portion 32 provided to protrude beyond the electronic components 2 in the Z direction.

When viewed in the X direction, the joint portion 31 has a rectangular shape having dimensions overlapping one of the external electrodes 22 and 22 in the respective electronic components 2 and 2. Joint members 33 (refer to FIGS. 2 and 3) are used for joining the joint portions 31 and the external electrodes 22 and 22 to each other. The joint members 33 have conductivity and electrically connect the joint portions 31 and the external electrodes 22 and 22 to each other. For example, solders or conductive adhesives can be used as the joint members 33. For example, an adhesive constituted using a resin such as a thermosetting resin and a conductive filler such as Ag can be used as a conductive adhesive. For example, a phenol resin, an acrylic resin, a silicone resin, an epoxy resin, a polyimide resin, or the like can be used as a thermosetting resin.

In the joint portion 31, pairs of upper and lower arm portions 34 and 35 sandwiching the electronic components 2 therebetween in the Z direction are provided. The arm portions 34 and 35 protrude from the joint portion 31 to the electronic component 2 side in the X direction. The arm portions 34 on the lower side are provided in lower portions of the joint portion 31 corresponding to one end surface 21*b* which becomes a facing surface with respect to the pad 4. For example, a width of the arm portion 34 on the lower side with respect to the Y direction becomes a width smaller than a width of the electronic component 2 with respect to the Y direction. The arm portions 34 on the lower side are formed by cutting parts of the joint portion 31 into a rectangular shape excluding a lower side and bending these cut pieces to the electronic component 2 side.

The arm portions 35 on the upper side are provided at an upper end of the joint portion 31 corresponding to the other end surface 21*b* positioned on a side opposite to the pad 4. A width of the arm portion 35 on the upper side with respect to the Y direction is approximately the same as the width of the arm portion 34 on the lower side with respect to the Y direction. Since the arm portions 34 and 35 sandwich the electronic components 2 therebetween, the electronic components 2 and 2 are held by the metal terminals 12 and 12. Tip pieces 34*a* and 35*a* opening in the Z direction with respect to a base end side are respectively provided at tips of the arm portions 34 and 35. The tip pieces 34*a* and 35*a* function as guides when the electronic components 2 are inserted between the arm portions 34 and 35.

In the joint portion 31, as illustrated in FIG. 1, at least one penetration hole 36 is provided in a region facing the external electrode 22. For example, the penetration hole 36 is used for injecting the joint member 33 between the joint portion 31 and the external electrode 22. In addition, the penetration hole 36 is used for checking a joint state between the joint portion 31 and the external electrode by the joint member 33.

In the joint portion 31, as illustrated in FIG. 1, a plurality of projections 37 protruding to the external electrode 22 side are provided. These projections 37 reduce a contact area between the joint portion 31 and the external electrode 22 and curb transfer of vibration generated in the electronic component 2 to the pad 4 through the metal terminal 12. In addition, according to these projections 37, a clearance corresponding to an amount of protrusion of the projections 37 can be provided between the joint portion 31 and the external electrode 22. Accordingly, a space between the joint portion 31 and the external electrode 22 can be sufficiently filled with the joint member 33.

The leg portion 32 is a part joined to the pad 4 using solder H. The leg portion 32 has an extending part 41 leading to the joint portion 31, a first bent part 42 bent from a tip of the extending part 41 to the electronic component 2 side, and a second bent part 43 bent from a tip of the first bent part 42. The extending part 41 extends in the Z direction from a lower end of the joint portion 31 with a width equal to that of the joint portion 31. A length of the extending part 41 with respect to the Z direction is not particularly limited. However, in the present embodiment, it is longer than lengths of the arm portions 34 and 35 with respect to the X direction.

In the vicinity of a boundary between the joint portion 31 and the extending part 41, as illustrated in FIG. 1, at least one slit 45 is provided. The slit 45 extends in the Y direction in a manner of corresponding to each of the electronic components 2 and 2. For example, a width of the slit 45 with respect to the Y direction is approximately the same as or slightly larger than the widths of the arm portions 34 and 35 with respect to the Y direction. A position of the slit 45 with respect to the Z direction is below a position of the arm portion 34 on the lower side. The slit 45 curbs creeping-up of the solder H joining the metal terminal 12 and the pad 4 to each other from the leg portion 32 to the joint portion 31. Since creeping-up of the solder H is curbed by the slit 45, generation of a bridge between the leg portion 32 and the arm portion 34 on the lower side due to the solder can be curbed.

Figure 5:
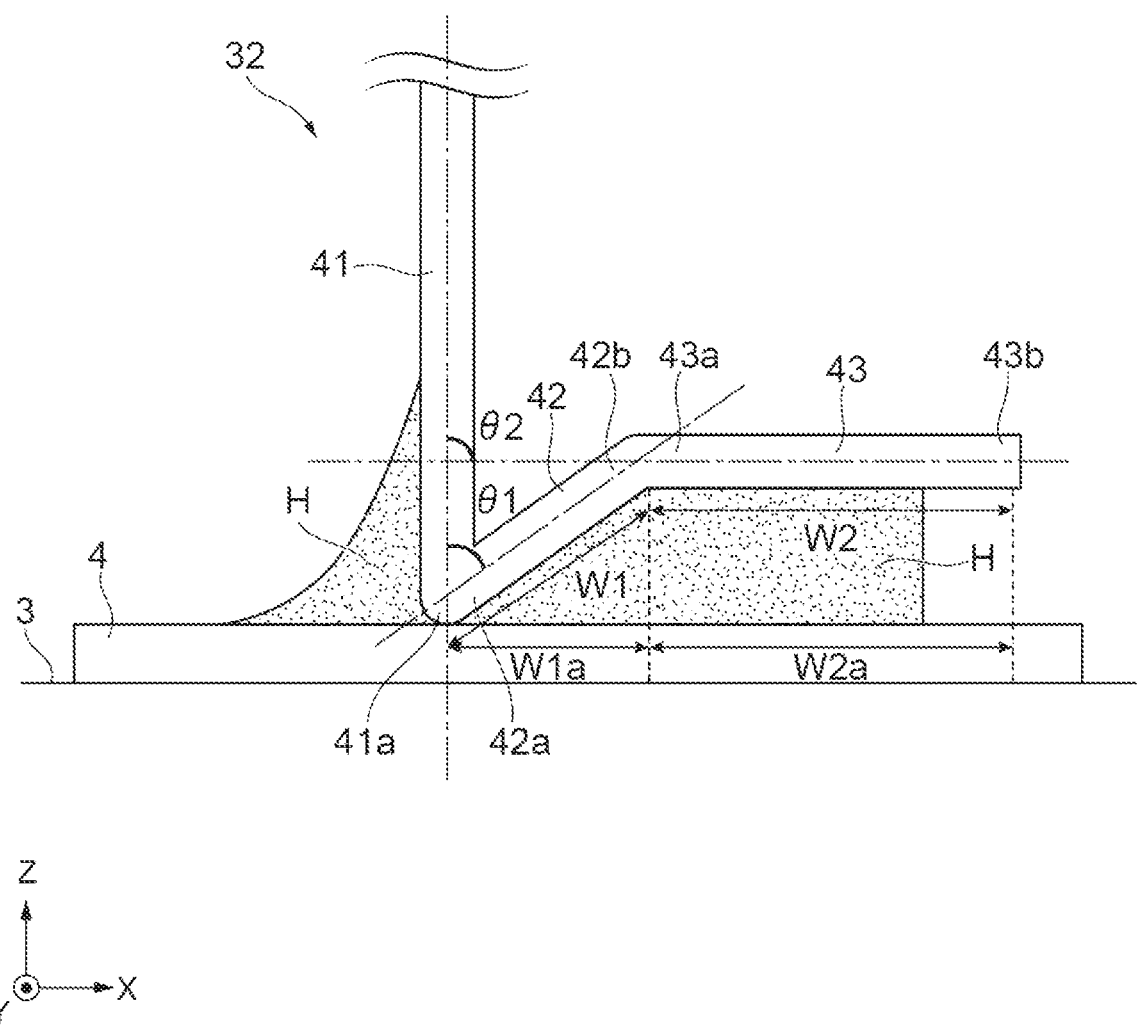
FIG. 5 is an enlarged side view of a main part illustrating an area around a leg portion of the metal terminal.

FIG. 5 is an enlarged side view of a main part illustrating an area around a leg portion of the metal terminal. In the same diagram, an area around the leg portion 32 of one metal terminal 12 is illustrated. However, an area around the leg portion of the other metal terminal 12 also has a similar structure (a symmetrical structure with respect to the center of the electronic component 2 in the X direction). As illustrated in FIG. 5, the first bent part 42 is bent from the tip of the extending part 41 to the electronic component 2 side at a first angle $\theta 1$ formed to be an acute angle with respect to the extending part 41. Therefore, the extending part 41 and the first bent part 42 form a V-shape when viewed in the Y direction. In the present embodiment, for example, the first angle θ1 is equal to or larger than 300 and smaller than 90°. The first angle θ1 may be 30° to 80°. In the first bent part 42, a gap with respect to the pad 4 increases toward a tip 42b side (a base end side of the second bent part 43) from a base end 42a side (a tip 41a side of the extending part 41).

The second bent part 43 is bent from the tip of the first bent part 42 at a second angle θ2 larger than the first angle θ1 with respect to the extending part 41. Here, the second angle θ2 is a right angle. Therefore, the second bent part 43 is orthogonal to the extending part 41 and is parallel to the pad 4. A tip 43b of the second bent part 43 is a free end. In the second bent part 43, a gap with respect to the pad 4 is uniform from a base end 43a side (the tip 42b side of the first bent part 42) to the tip 43b side (the free end of the second bent part 43). The tip 43b of the second bent part 43 is positioned on the electronic component 2 side of the tip 41a of the extending part 41. That is, the tip 41a of the extending part 41 is at the lowermost point of the leg portion 32.

A length W2 of the second bent part 43 is longer than a length W1 of the first bent part 42. When the length W1 of the first bent part 42 is 1, for example, the length W2 of the second bent part 43 becomes 1.5 to 5.0. In the present embodiment, a projection length W2a of the second bent part 43 in the X direction is also longer than a projection length W1a of the first bent part 42 in the X direction. The first bent part 42 and the second bent part 43 extend longer than the arm portions 34 and 35 in the X direction, and the tip 43b of the second bent part 43 is positioned on the center side of the tips of the arm portions 34 and 35 in the X direction in the electronic component 2 (refer to FIG. 2).

For example, the leg portion 32 and the pad 4 are joined to each other by reflow soldering. In the present embodiment, when the solder H is formed, for example, a Sn—Ag—Cu-based solder paste Hp (refer to FIG. 6A and the like) can be used. In this case, the solder paste Hp includes Sn, Ag, Cu, and a flux. The solder paste Hp may include a solution. For example, a rosin can be used as a flux.

The solder H is formed between the tip 41a of the extending part 41, a tip outer surface side (a side opposite to the first bent part 42 and the second bent part 43), and a tip inner surface side (a side where the first bent part 42 and the second bent part 43 are formed); and the pad 4. The metal terminal 12 and the pad 4 are electrically connected to each other due to the solder H. The solder H on the outer surface side of the tip of the extending part 41 is formed to fill a corner portion made by the tip 41a of the extending part 41 and the pad 4. The solder H on the tip inner surface side of the extending part 41 is formed to fill a clearance between the first bent part 42 and the pad 4 and a clearance between the second bent part 43 and the pad 4 excluding the tip 43b of the second bent part 43 side.

Figure 6A:
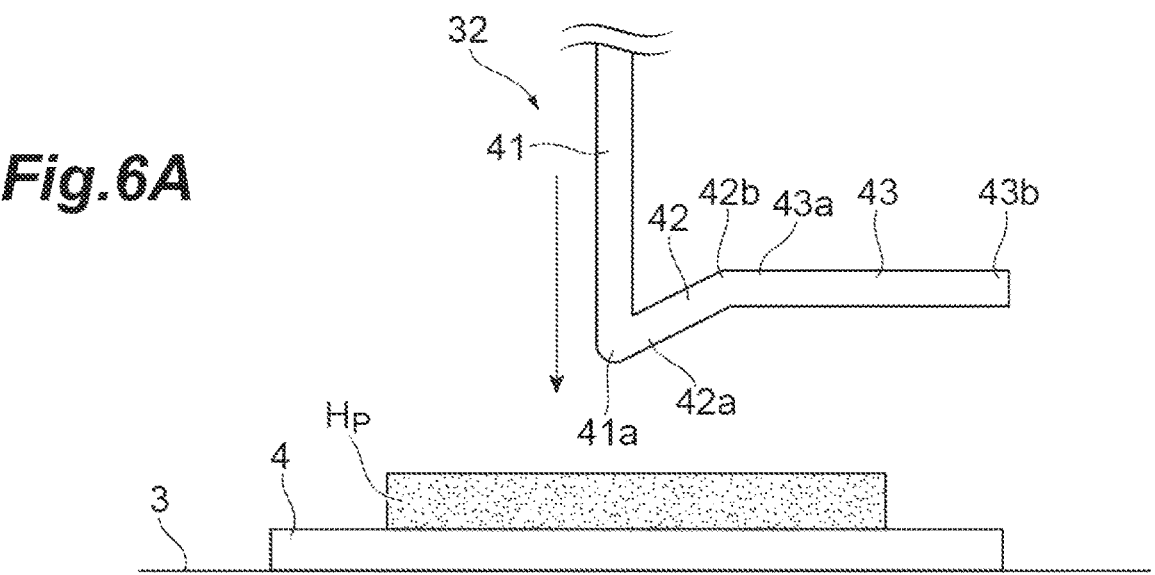
FIG. 6A is an enlarged side view of the main part illustrating a state of manufacturing the connection structure according to the present embodiment.
Figure 6B:
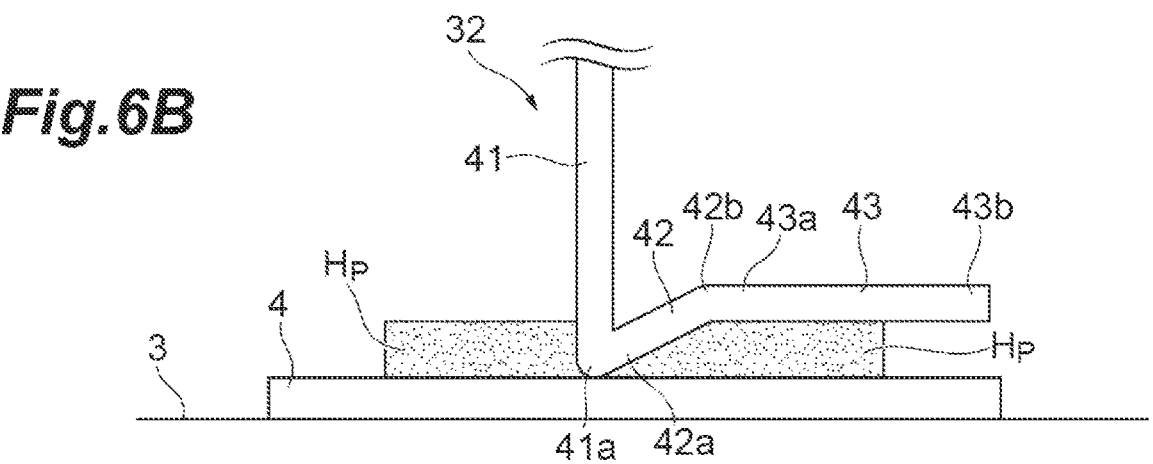
FIG. 6B is an enlarged side view of the main part illustrating another state of manufacturing the connection structure according to the present embodiment.
Figure 6C:
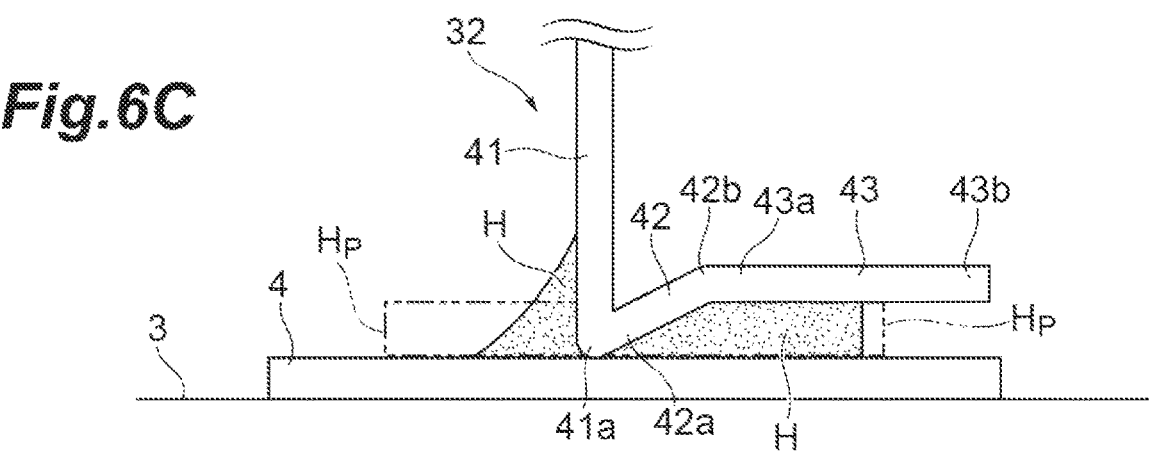
FIG. 6C is an enlarged side view of the main part illustrating another state of manufacturing the connection structure according to the present embodiment.

FIGS. 6A to 6C are enlarged side views of the main part illustrating states of manufacturing the connection structure according to the present embodiment. When the connection structure 1 is formed, first, as illustrated in FIG. 6A, the electronic component 11 with a metal terminal, and the connection target member 3 in which the solder paste Hp is disposed in the pad 4 are prepared. For example, the solder paste Hp is applied to a surface of the pad 4 with a predetermined thickness by a printing method. For example, the thickness of the solder paste Hp is approximately the same as a gap between the second bent part 43 and the pad 4 when the tip 41a of the extending part 41 of the metal terminal 12 is caused to abut on the pad 4 in the following first step.

Next, as illustrated in FIG. 6B, the tip 41a of the extending part 41 of the metal terminal 12 in the electronic component 11 with a metal terminal is caused abut on the pad 4 of the connection target member 3 in which the solder paste Hp is disposed (first step). In this state where the tip 41a of the extending part 41 of the metal terminal 12 is caused abut on the pad 4, the solder paste Hp is brought into contact with each of the tip 41a of the extending part 41, the first bent part 42, and the second bent part 43 of the metal terminal 12.

Next, as illustrated in FIG. 6C, the solder paste Hp is melted and solidified in a state where the solder paste Hp is brought into contact with the tip 41a of the extending part 41, the first bent part 42, and the second bent part 43 of the metal terminal 12, and the leg portion 32 of the metal terminal 12 is joined to the pad 4 of the connection target member 3 (second step). Here, for example, the metal terminal 12 is heated, and a Sn—Ag—Cu-based solder included the solder paste Hp is melted. When the melted solder paste Hp is cooled and the solder paste Hp is solidified, the solder H is formed. The leg portion 32 of the metal terminal 12 is joined to the pad 4 by means of the solder H, and the connection structure 1 illustrated in FIG. 1 is formed.

As described above, in the electronic component 11 with a metal terminal, the leg portion 32 of each of the pair of metal terminals 12 and 12 has the first bent part 42 which is bent from the tip 41a of the extending part 41 to the electronic component 2 side at the first angle θ1 formed to be an acute angle with respect to the extending part 41. Accordingly, when the tip 41a of the extending part 41 is caused to abut on the pad 4, unevenness in height dimension of the electronic component 2 can be offset by an amount of bending of the first bent part 42 and the second bent part 43 at the tip of the metal terminal 12, and thus unevenness in height dimension of the connection structure 1 at the time of mounting can be curbed.

In addition, in the electronic component 11 with a metal terminal, the leg portion 32 of each of the pair of metal terminals 12 and 12 has the second bent part 43 bent from the tip 42b of the first bent part 42 at the second angle θ2 larger than the first angle θ1 with respect to the extending part 41. Since such a second bent part 43 is provided, the solder H positioned between the leg portion 32 and the pad 4 at the time of mounting comes into contact with the second bent part 43 and is likely to stay at this place, and thus an amount of the solder H contracting on an abutting part side between the tip 41a of the extending part 41 and the pad 4 can be regulated.

Figure 7A:
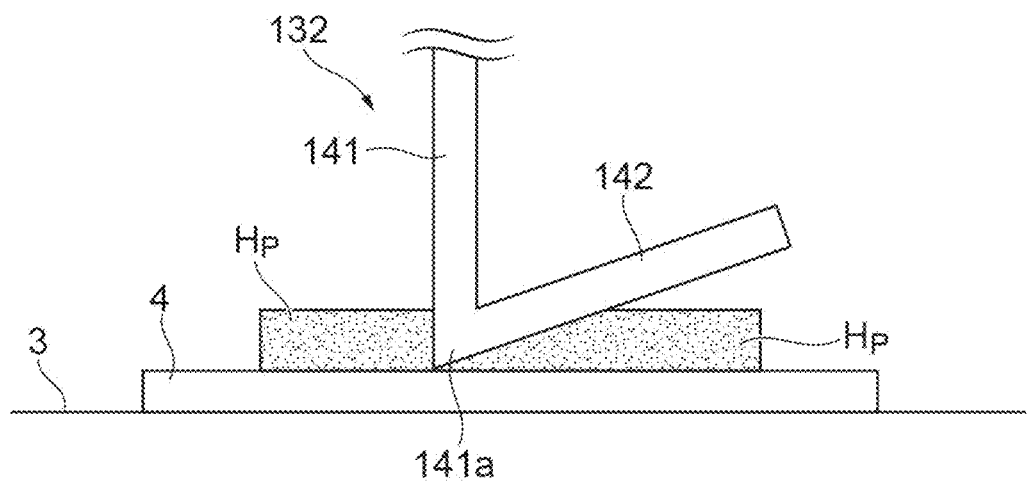
FIG. 7A is an enlarged side view of the main part illustrating a state of manufacturing a connection structure according to a comparative example.
Figure 7B:
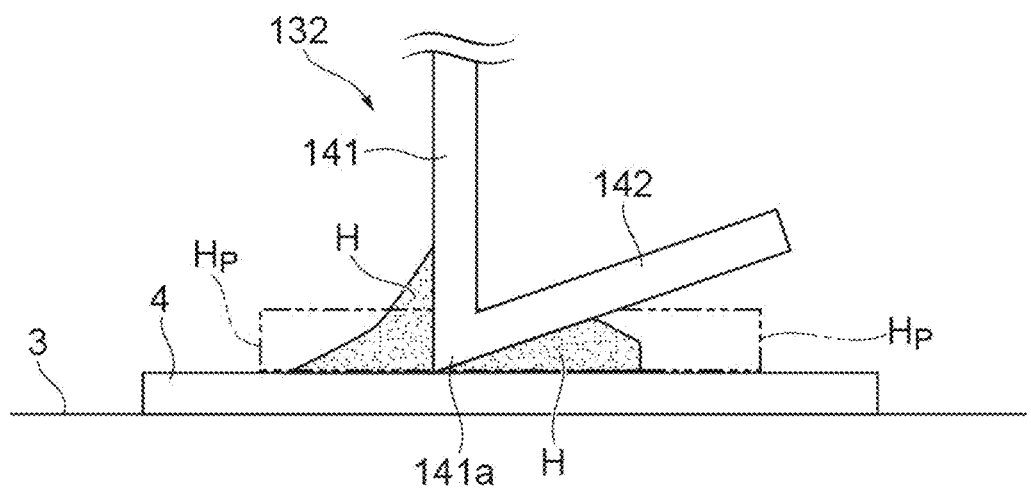
FIG. 7B is an enlarged side view of the main part illustrating another state of manufacturing the connection structure according to the comparative example.

FIGS. 7A and 7B are enlarged side views of the main part illustrating states of manufacturing a connection structure according to a comparative example. In an electronic component with a metal terminal according to the comparative example, as illustrated in FIG. 7A, a leg portion 132 of the metal terminal has only an extending part 141 and a first bent part 142. In this case, when a tip 141a of the extending part 141 is caused to abut on the pad 4 of the connection target member 3 in which the solder paste Hp is disposed, the solder paste Hp on the tip inner surface side of the extending part 141 comes into contact with only the base end side of the first bent part 142.

If the solder paste Hp is melted and solidified in this state, as illustrated in FIG. 7B, the solder H tends to be likely to contract on the abutting part side between the tip 141a of the extending part 141 and the pad 4. It is conceivable that if the solder H significantly contracts on the abutting part side between the tip 141a of the extending part 141 and the pad 4, a joint area between the metal terminal and the pad 4 due to the solder H becomes insufficient. In addition, since the volume of the solder H is biased to the tip outer surface side from the tip inner surface side of the extending part 141, the leg portion 132 is likely to be pulled to the outward side of the electronic component in the X direction. Therefore, there is concern that a mounting position of the electronic component with a metal terminal may become unstable.

On the contrary, in the electronic component 11 with a metal terminal according to the present embodiment, since the amount of the solder H contracting on the abutting part side between the tip 41a of the extending part 41 and the pad 4 can be regulated, the joint area between the metal terminal 12 and the pad 4 due to the solder H can be sufficiently secured. In addition, since the volume of the solder H can be sufficiently secured on the tip inner surface side of the extending part 41, pulling of the leg portion 32 of the metal terminal 12 to the outward side of the electronic component 2 in the X direction can also be curbed. Therefore, the mounting position of the electronic component 11 with a metal terminal with respect to the X direction can be made stable.

In the present embodiment, the second angle θ2 of the second bent part 43 with respect to the extending part 41 is a right angle. Accordingly, the solder paste Hp positioned between the leg portion 32 and the pad 4 at the time of mounting is more likely to come into contact with the second bent part 43, and thus the amount of the solder H contracting on the abutting part side between the tip 41a of the extending part 41 and the pad 4 can be more sufficiently regulated.

In the present embodiment, the length W2 of the second bent part 43 is longer than the length W1 of the first bent part 42. Since the length W2 of the second bent part 43 is sufficiently secured, the solder paste Hp positioned between the leg portion 32 and the pad 4 at the time of mounting is more likely to come into contact with the second bent part 43, and thus the amount of the solder H contracting on the abutting part side between the tip 41a of the extending part 41 and the pad 4 can be more sufficiently regulated.

In the present embodiment, the tip 43b of the second bent part 43 is positioned on the electronic component 2 side of the tip of the extending part 41. Accordingly, since the tip 41a of the extending part 41 is at the lowermost point of the leg portion 32 in the Z direction, when the tip 41a of the extending part 41 is caused to abut on the pad 4, the tip 43b of the second bent part 43 can be prevented from touching the pad 4. Therefore, inhibition of an effect of curbing unevenness in height dimension at the time of mounting can be avoided.

Figure 8A:
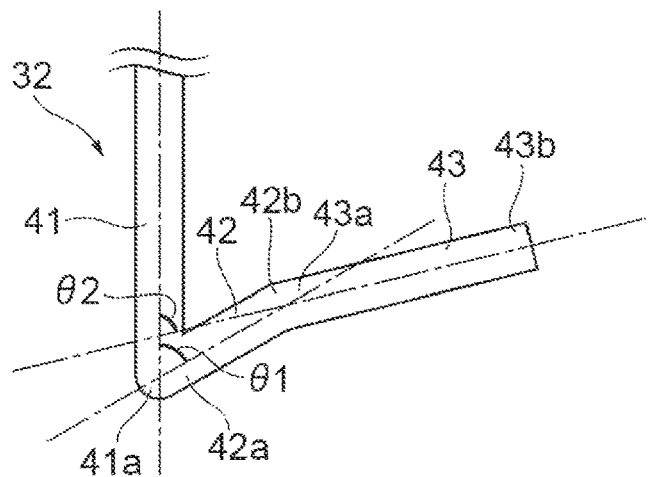
FIG. 8A is an enlarged side view of the main part illustrating an area around the leg portion of the electronic component with a metal terminal according to a modification example.
Figure 8B:
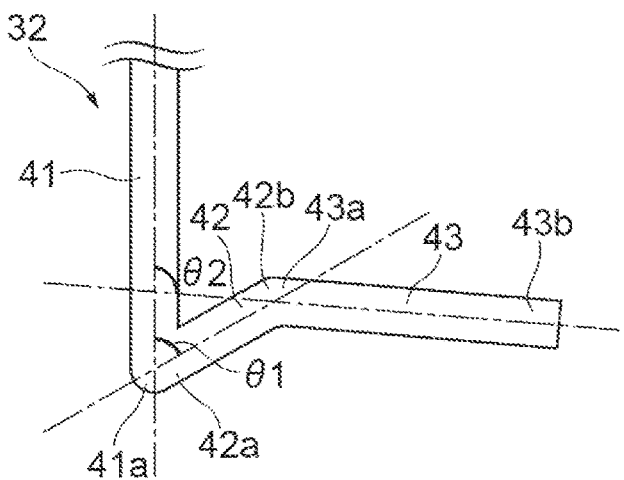
FIG. 8B is an enlarged side view of the main part illustrating an area around the leg portion of the electronic component with a metal terminal according to the modification example.
Figure 8C:
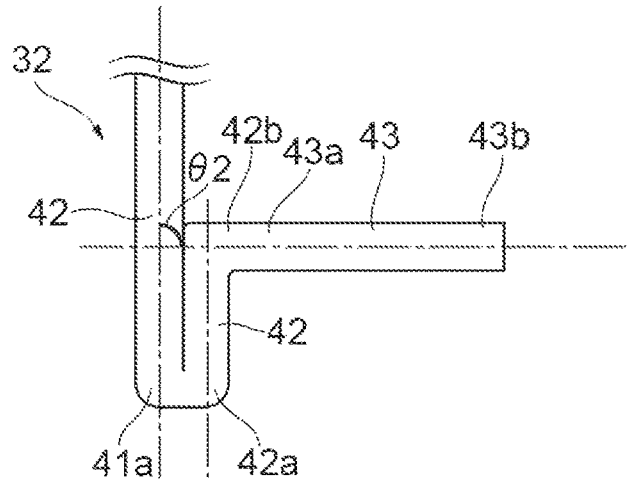
FIG. 8C is an enlarged side view of the main part illustrating an area around the leg portion of the electronic component with a metal terminal according to the modification example.

The present disclosure is not limited to the foregoing embodiment. For example, in the foregoing embodiment, the second angle θ2 of the second bent part 43 with respect to the extending part 41 is a right angle. However, the second angle θ2 may not necessarily be a right angle and need only be larger than the first bent part 42 with respect to the first angle θ1 of the extending part 41. As illustrated in FIG. 8A, the second angle θ2 may be an acute angle, and as illustrated in FIG. 8B, the second angle θ2 may be an obtuse angle. Even when the second angle θ2 is an obtuse angle, it is preferable that the tip 43b of the second bent part 43 be positioned on the electronic component 2 side from the tip of the extending part 41. In addition, as illustrated in FIG. 8C, the first bent part 42 with respect to the first angle θ1 of the extending part 41 may be substantially 0° (parallel to the extending part 41). In this case as well, the second angle θ2 may be any of a right angle, an acute angle, and an obtuse angle.

Figure 9:
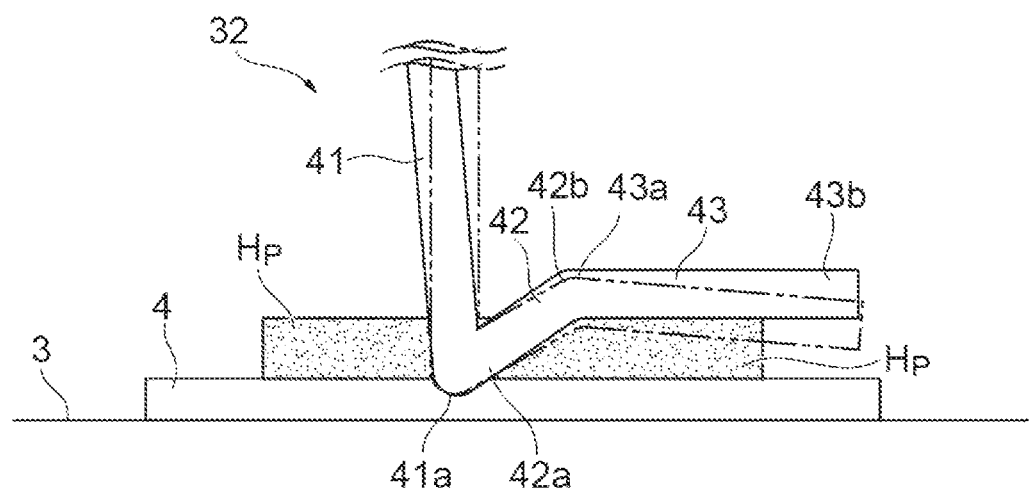
FIG. 9 is an enlarged side view of the main part illustrating an example of a constitution of the connection structure when the modification example illustrated in FIG. 8B is used.

As illustrated in FIGS. 8A and 8B, when the second angle θ2 is not a right angle, the second bent part 43 may have a part parallel to the pad 4 of the connection target member 3 for connecting the electronic component 11 with a metal terminal to the connection target member 3. FIG. 9 is an enlarged side view of the main part illustrating an example of a constitution of the connection structure 1 when the second bent part 43 has the constitution illustrated in FIG. 8B. In the example of the same diagram, the second bent part 43 in its entirety can become parallel to the pad 4 by causing the extending part 41 to be inclined to the outward side in the X direction with respect to the pad 4.

Accordingly, similar to the case where the second angle θ2 of the second bent part 43 with respect to the extending part 41 is a right angle, the solder paste Hp positioned between the leg portion 32 and the pad 4 at the time of mounting is more likely to come into contact with the second bent part 43, and thus the amount of the solder H contracting on the abutting part side between the tip 41a of the extending part 41 and the pad 4 can be more sufficiently regulated. Although it is not illustrated, when the second bent part 43 has the constitution illustrated in FIG. 8A, the second bent part 43 in its entirety can become parallel to the pad 4 by causing the extending part 41 to be inclined to the inward side in the X direction with respect to the pad 4.

In addition, in the foregoing embodiment, the length W2 of the second bent part 43 is longer than the length W1 of the first bent part 42, but the relationship between the lengths W1 and W2 is not limited thereto. The length W2 of the second bent part 43 may be equivalent to the length W1 of the first bent part 42 or may be shorter than the length W1 of the first bent part 42.

Figure 10:
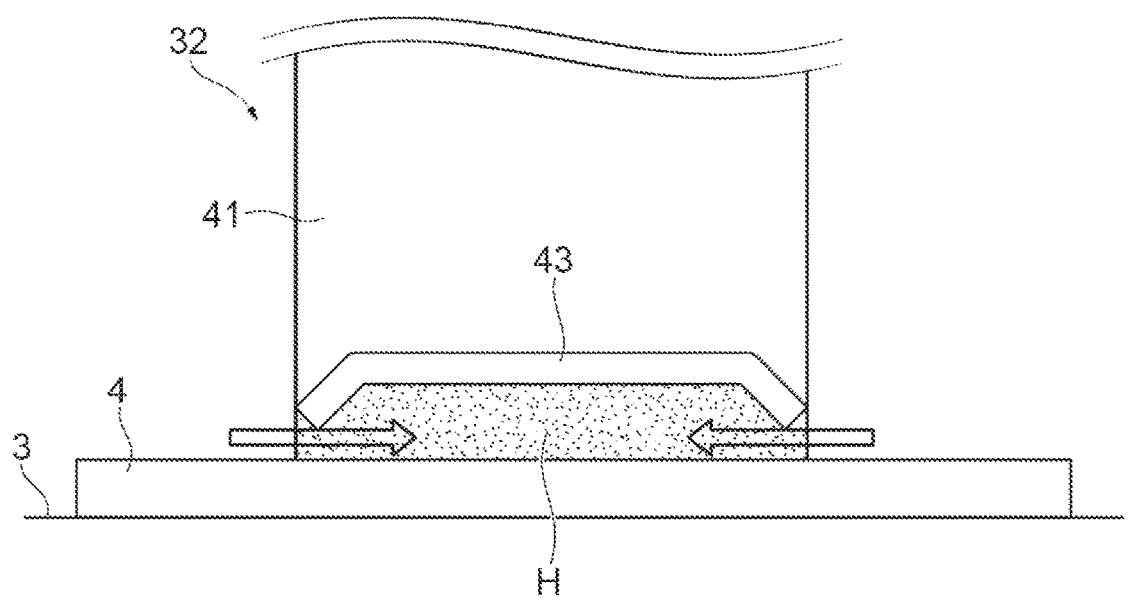
FIG. 10 is an enlarged side view of the main part illustrating an area around the leg portion of the electronic component with a metal terminal according to another modification example.

In addition, as illustrated in FIG. 10, when viewed in the X direction, the second bent part 43 may be curved such that the electronic component 2 side protrudes. In this case, since the solder H contracts to the center side in the Y direction at the time of melting and solidifying the solder paste Hp, pulling of the leg portion 32 of the metal terminal 12 to the outward side of the electronic component 2 in the Y direction can be curbed. Therefore, the mounting position of the electronic component 11 with a metal terminal with respect to the Y direction can be made stable. In the example of FIG. 10, the second bent part 43 has a projecting shape having a flat top surface, but it is not limited to such a shape. For example, it may have a projecting shape which is gently curved such that the entirety forms an arc.

In the foregoing embodiment, as an example, a laminated capacitor has been described as the electronic component 2, but an electronic component to which the present disclosure can be applied is not limited to a laminated capacitor. For example, the present disclosure can also be applied to laminated electronic components such as laminated inductors, laminated variable resisters, laminated piezoelectric actuators, laminated thermistors, and laminated composite components; and electronic components other than laminated electronic components.

What is claimed is:

1. An electronic component with a metal terminal comprising:
   one or a plurality of electronic components having an element body, and a pair of external electrodes respectively provided on a pair of end surfaces facing each other in a first direction in the element body; and
   a pair of plate-shaped metal terminals having joint portions joined to the external electrodes, and leg portions provided to protrude beyond the electronic components in a second direction intersecting the first direction, wherein the leg portion of each of the pair of metal terminals has
an extending part continuously extending in the second direction from the joint portion,
a first bent part bent from a tip of the extending part to the electronic component side at a first angle formed to be an acute angle with respect to the extending part, and
a second bent part bent from a tip of the first bent part at a second angle larger than the first angle with respect to the extending part.

2. The electronic component with a metal terminal according to claim 1,
wherein the second angle is a right angle.

3. The electronic component with a metal terminal according to claim 1,
wherein a length of the second bent part is longer than a length of the first bent part.

4. The electronic component with a metal terminal according to claim 1,
wherein a tip of the second bent part is positioned on the electronic component side of the tip of the extending part.

5. The electronic component with a metal terminal according to claim 1,
wherein when viewed in the first direction, the second bent part is curved such that the electronic component side protrudes.

6. A connection structure formed by connecting the electronic component with a metal terminal according to claim 1 to a connection target member,
wherein the tip of the extending part, the first bent part, and the second bent part of the metal terminal in the electronic component with a metal terminal are joined to a mounting surface of the connection target member using solder.

7. The connection structure according to claim 6,
wherein the second bent part has a part parallel to the mounting surface of the connection target member.

8. A method for manufacturing a connection structure formed by connecting the electronic component with a metal terminal according to claim 1 to a connection target member, the method for manufacturing a connection structure comprising:
a first step of causing the tip of the extending part of the metal terminal in the electronic component with a metal terminal to abut on a mounting surface of the connection target member having a solder paste disposed thereon; and
a second step of joining the leg portion of the metal terminal to the mounting surface of the connection target member by melting and solidifying the solder paste in a state where the solder paste is brought into contact with the tip of the extending part, the first bent part, and the second bent part of the metal terminal.

9. The method for manufacturing a connection structure according to claim 8,
wherein in the second step, a part parallel to the mounting surface of the connection target member is formed in the second bent part.

* * * * *